(12) United States Patent
Clark

(10) Patent No.: US 10,005,400 B1
(45) Date of Patent: Jun. 26, 2018

(54) SUN VISOR EYE WEAR HOLDER

(71) Applicant: Debra Clark, Jackson, GA (US)

(72) Inventor: Debra Clark, Jackson, GA (US)

( * ) Notice: Subject to any disclaimer, the term of this patent is extended or adjusted under 35 U.S.C. 154(b) by 0 days. days.

(21) Appl. No.: 15/437,598

(22) Filed: Feb. 21, 2017

(51) Int. Cl.
*B60R 7/05* (2006.01)
*B60R 7/08* (2006.01)
*B60J 3/02* (2006.01)

(52) U.S. Cl.
CPC ............ *B60R 7/082* (2013.01); *B60R 7/05* (2013.01); *B60J 3/0204* (2013.01)

(58) Field of Classification Search
CPC .......... B60R 7/05; B60R 7/082; B60J 3/0204
See application file for complete search history.

(56) References Cited

U.S. PATENT DOCUMENTS

| 1,898,276 | A | | 2/1933 | Dresser | |
|---|---|---|---|---|---|
| 2,486,096 | A | | 10/1949 | Axford | |
| 2,655,299 | A | | 10/1953 | Heyden | |
| 2,735,597 | A | | 2/1956 | Treleven | |
| 4,844,311 | A | | 7/1989 | Kalen | |
| 5,433,362 | A | | 7/1995 | Battaglia | |
| 5,762,246 | A | * | 6/1998 | Drew | B60R 7/05 206/308.1 |
| 7,101,040 | B2 | | 9/2006 | Karasik | |
| 2006/0011687 | A1 | * | 1/2006 | Wadley | A45F 3/00 224/587 |
| 2007/0039984 | A1 | * | 2/2007 | Mantis | B60R 7/05 224/312 |
| 2007/0235484 | A1 | * | 10/2007 | Staniszewski | B60R 7/05 224/312 |

* cited by examiner

Primary Examiner — Corey Skurdal

(57) ABSTRACT

The sun visor eye wear holder comprises a panel, a plurality of pockets, and a plurality of straps. The plurality of pockets attach to the panel. The plurality of straps attach to the panel. Each of the plurality of straps forms a loop that attaches the panel to a sun visor of a vehicle. The sun visor eye wear holder is a structure that attaches to a sun visor of a vehicle for the purpose of storing domestic articles such as eyeglasses.

1 Claim, 5 Drawing Sheets

SUN VISOR EYE WEAR HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including vehicles and vehicle fittings, more specifically, a stowing or holding device mounted on a sun visor.

SUMMARY OF INVENTION

The sun visor eye wear holder comprises a panel, a plurality of pockets, and a plurality of straps. The plurality of pockets attach to the panel. The plurality of straps attach to the panel. Each of the plurality of straps forms a loop that attaches the panel to a sun visor of a vehicle. The sun visor eye wear holder is a structure that attaches to a sun visor of a vehicle for the purpose of storing domestic articles such as eyeglasses.

These together with additional objects, features and advantages of the sun visor eye wear holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the sun visor eye wear holder in detail, it is to be understood that the sun visor eye wear holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sun visor eye wear holder.

It is therefore important that the claims be regarded as including such equivalent construction insofar as they do not depart from the spirit and scope of the sun visor eye wear holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
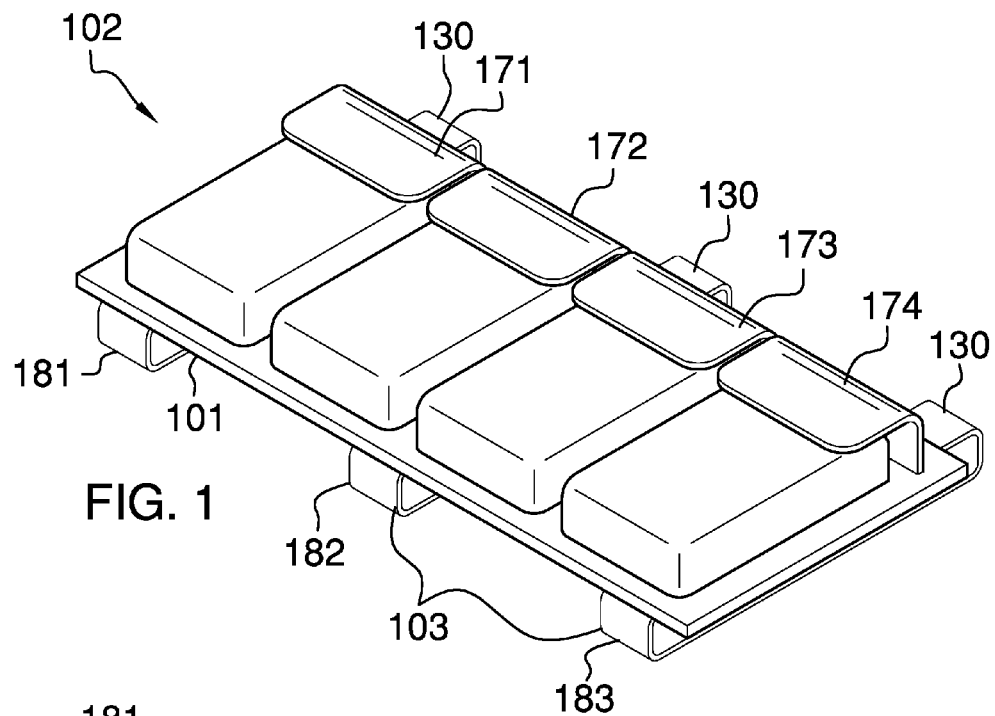
FIG. 1 is a perspective view of an embodiment of the disclosure.
Figure 2:
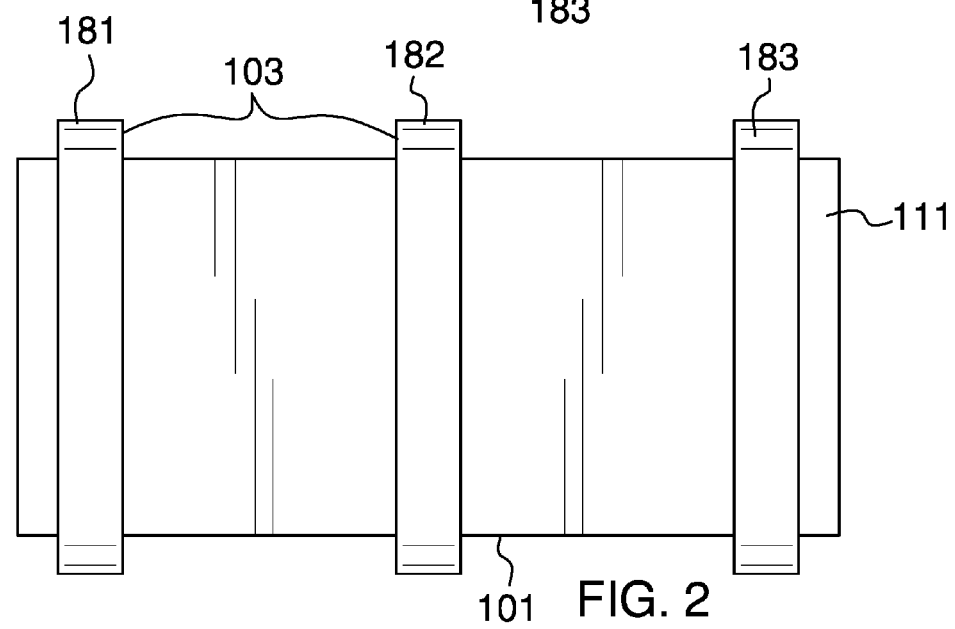
FIG. 2 is a back view of an embodiment of the disclosure.
Figure 3:
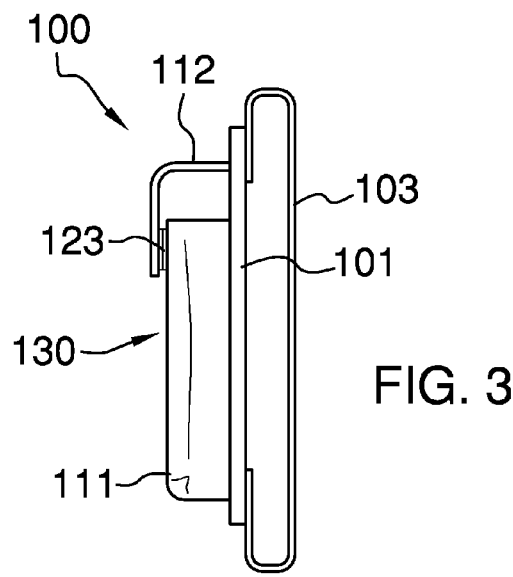
FIG. 3 is a side view of an embodiment of the disclosure.
Figure 4:
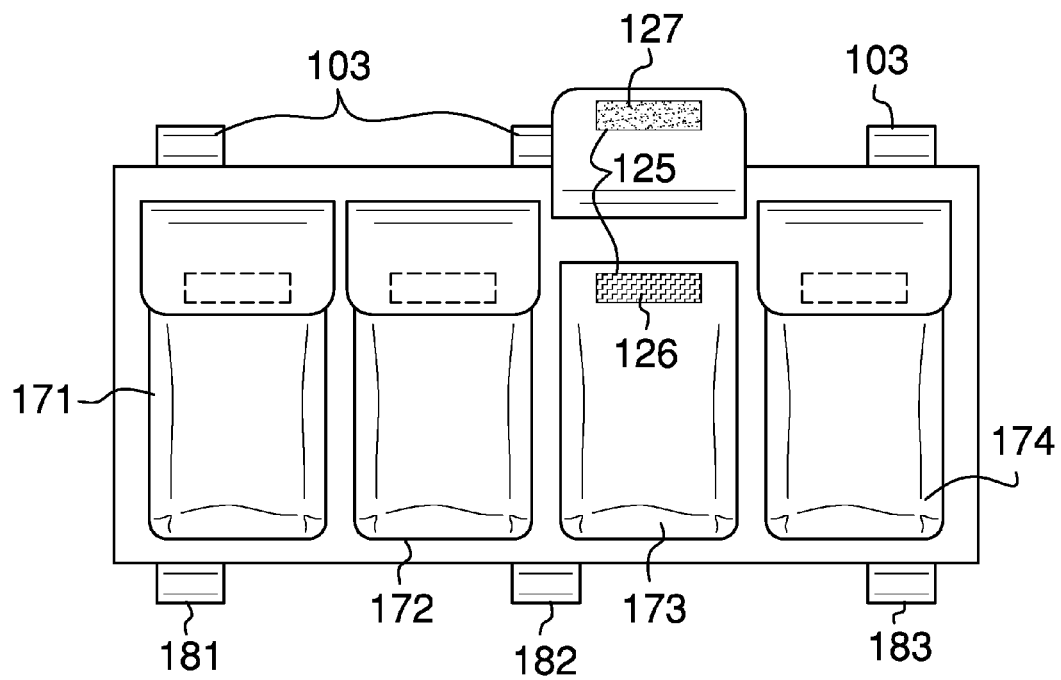
FIG. 4 is a front view of an embodiment of the disclosure.
Figure 5:
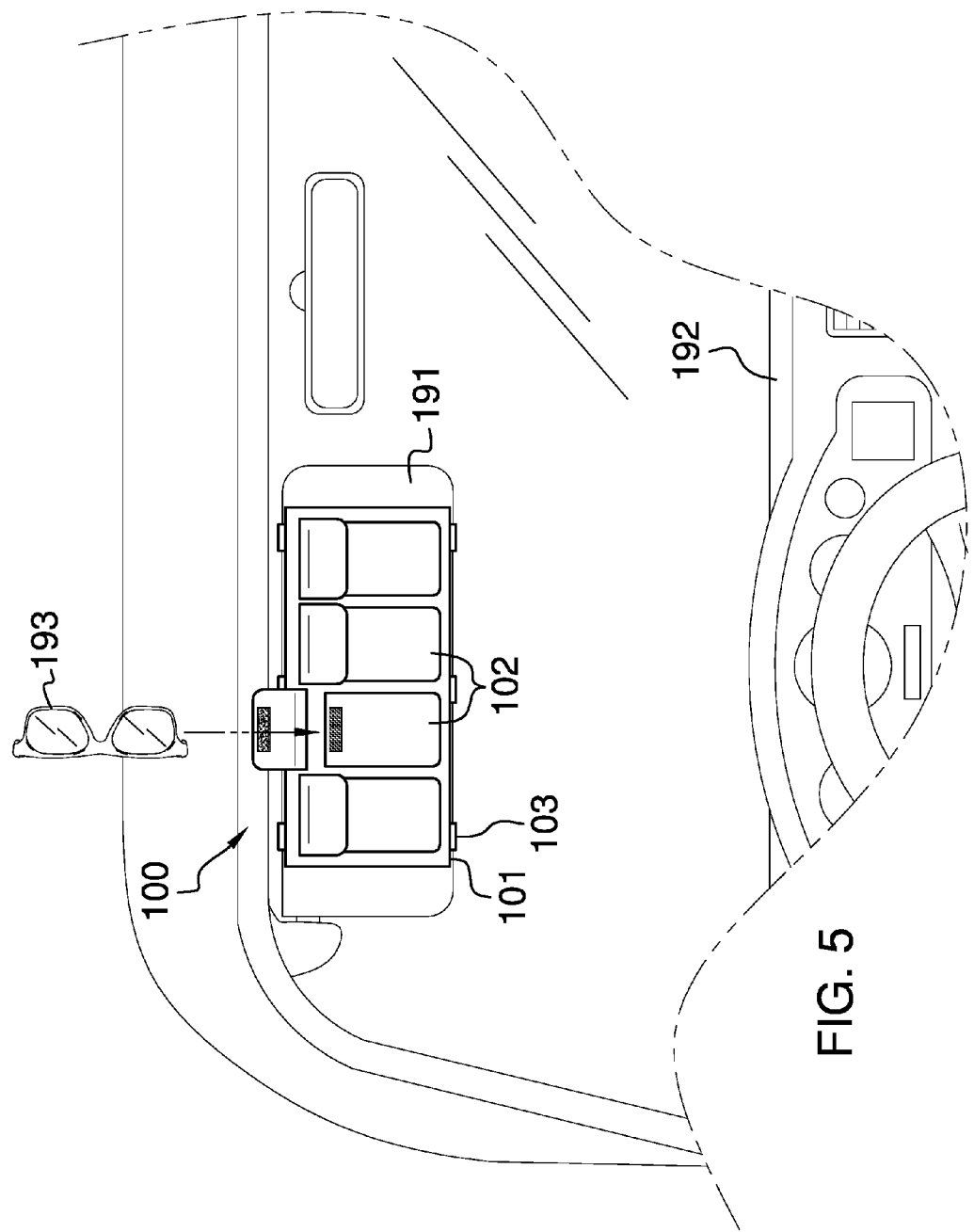
FIG. 5 is an in use view of an embodiment of the disclosure.
Figure 6:
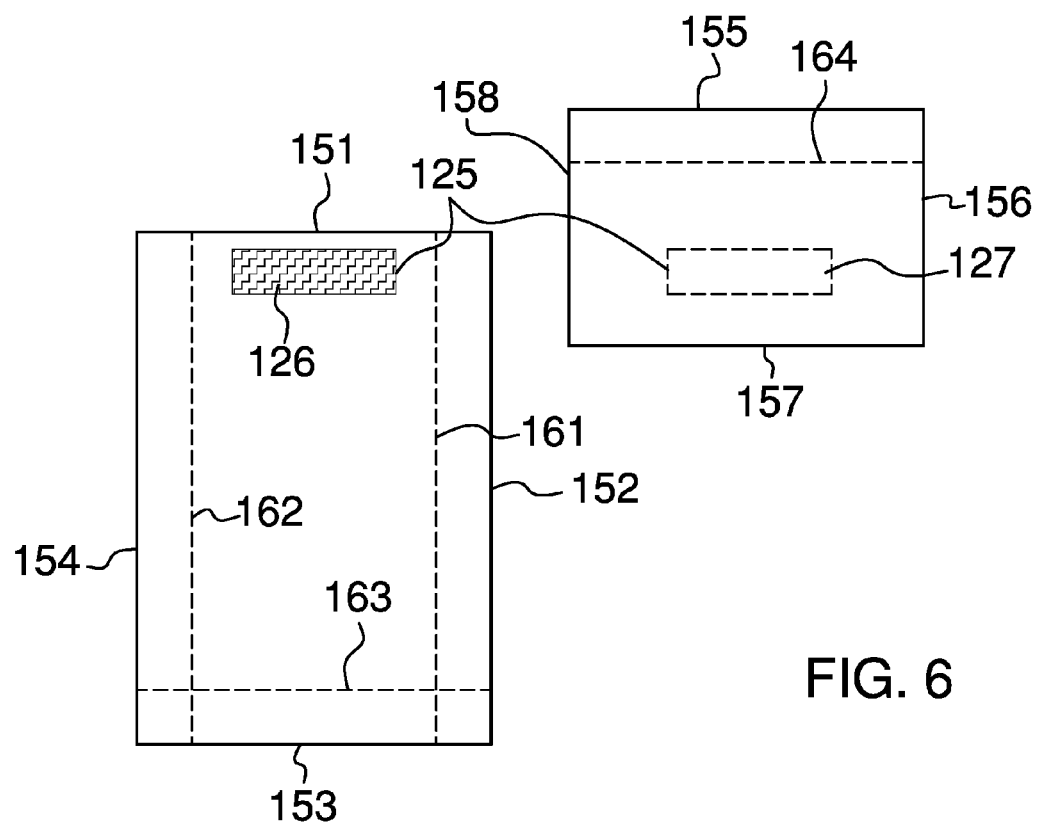
FIG. 6 is a detail view of an embodiment of the disclosure.
Figure 7:
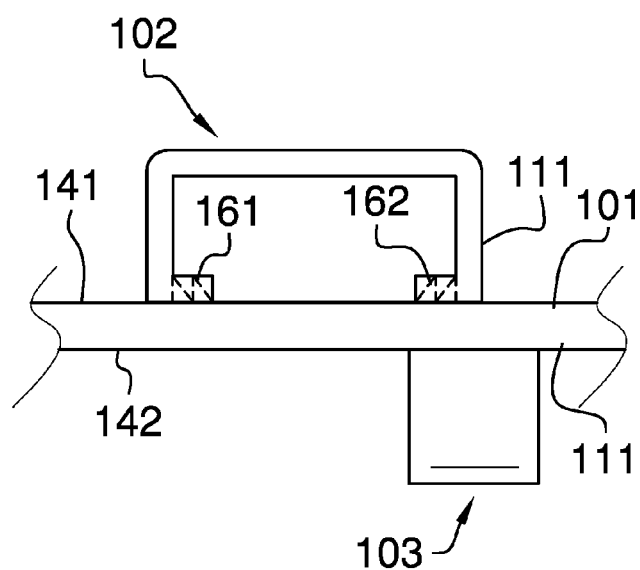
FIG. 7 is a detail view of an embodiment of the disclosure.
Figure 8:
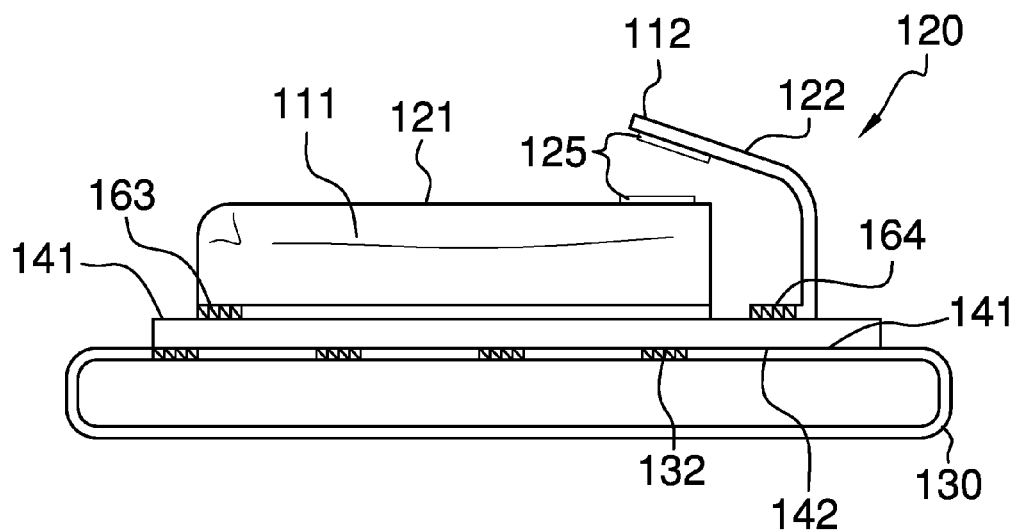
FIG. 8 is a detail view of an embodiment of the disclousre.
Figure 9:
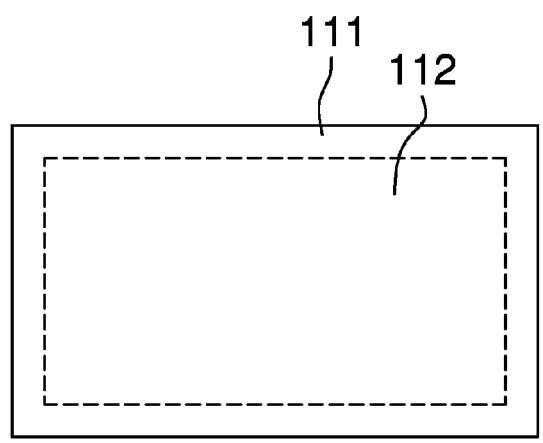
FIG. 9 is a detail view of an embodiment of the disclosure.

Detailed reference will now be made to one or more potential embodiments of the disclosure, which are illustrated in FIGS. 1 through 9.

The sun visor eye wear holder 100 (hereinafter invention) comprises a panel 101, a plurality of pockets 102, and a plurality of straps 103. The plurality of pockets 102 attach to the panel 101. The plurality of straps 103 attach to the panel 101. Each of the plurality of straps 103 forms a loop that attaches the panel 101 to a sun visor 191 of a vehicle 192. The invention 100 is a structure that attaches to a sun visor 191 of a vehicle 192 for the purpose of storing domestic articles 193 such as eyeglasses.

The panel 101 comprises a plate 111 that is formed in the shape of a rectangular block. The plate 111 is further defined with a first surface 141 and a second surface 142.

The plurality of pockets 102 further comprises a collection of individual pockets 120. Each of the plurality of pockets 102 is a securable pocket that is used to store domestic articles 193. Each individual pocket 120 comprises a first sheeting 121, a second sheeting 122, a fastener 123, and a first plurality of seams 124. The first sheeting 121 a first rectangular structure that forms the containment chamber of the individual pocket 120. The first sheeting 121 is further defined with a first edge 151, a second edge 152, a third edge 153, a fourth edge 154, a first fold 161, a second fold 162, and a third fold 163. The second sheeting 122 is a second rectangular structure that forms a flap that acts as the closure of the individual pocket 120. The second sheeting 122 is further defined with a fifth edge 155, a sixth edge 156, a seventh edge 157, an eighth edge 158, and a fourth fold 164. The fastener 123 secures the second sheeting 122 to the first sheeting 121. The first plurality of seams 124 attach the first sheeting 121 and the second sheeting 122 to the panel 101. The fastener 123 is a hook and loop fastener 125.

The hook and loop fastener 125 further comprises a first hook or loop surface 126, and a second hook or loop surface 127. The first hook or loop surface 126 of the hook and loop fastener 125 attaches to the first sheeting 121 of the individual pocket 120 such that the second hook or loop surface 127 will lay on top of the first hook or loop surface 126 when the second sheeting 122 is folded on top of the first sheeting 121. The second hook or loop surface 127 of the hook and loop fastener 125 attaches to the second sheeting 122 of the individual pocket 120 such that the second hook or loop surface 127 will lay on top of the first hook or loop surface 126 when the second sheeting 122 is folded on top of the first sheeting 121.

The plurality of straps 103 further comprises a collection of individual straps 130. Each individual strap 130 comprises an elastic webbing 131, and an elastic seam 132. The elastic webbing 131 comprises a readily and commercially available elastic webbing 131. The elastic webbing 131 is formed into a loop that is attached to the second surface 142 of the plate 111. Methods to form loops in elastic webbings 131 are well known and documented in the textile arts.

The first potential embodiment of the disclosure is assembled as described in this paragraph and the next two paragraphs. The first sheeting 121 of the individual pocket 120 attaches to the first surface 141 of the plate 111. The second sheeting 122 of the individual pocket 120 attaches to the first surface 141 of the plate 111. The second edge 152 is folded around the first fold 161. The folded second edge 152 attaches to the first surface 141 of the plate 111 using a seam selected from the first plurality of seams 124. The fourth edge 154 is folded around the second fold 162. The folded fourth edge 154 attaches to the first surface 141 of the plate 111 using a seam selected from the first plurality of seams 124. The third edge 153 is folded around the third fold 163. The folded third edge 153 attaches to the first surface 141 of the plate 111 using a seam selected from the first plurality of seams 124. The fifth edge 155 is folded around the fourth fold 164. The folded fifth edge 155 attaches to the first surface 141 of the plate 111 using a seam selected from the first plurality of seams 124.

The loop formed by the elastic webbing 131 of each individual strap 130 selected from the plurality of straps 103 is attached to the second surface 142 of the plate 111. The elastic seam 132 of each elastic webbing 131 is formed with an adhesive that attaches the elastic webbing 131 to the plate 111.

In the first potential embodiment of the disclosure, the plate 111 is formed from plastic. The first sheeting 121 comprises a rectangular plastic sheeting. The second sheeting 122 is a rectangular plastic sheeting. The fastener 123 comprises a hook and loop fastener 125. Each of the first plurality of seams 124 is formed with an adhesive.

A second potential embodiment of the disclosure is described in this paragraph and the next three paragraphs. The panel 101 further comprises a textile sleeve 112. The textile sleeve 112 is a sleeve formed from a textile material. Methods to form sleeves are well known and documented in the textile arts. The first sheeting 121 of the individual pocket 120 attaches to the textile sleeve 112. The second sheeting 122 of the individual pocket 120 attaches to the textile sleeve 112. The second edge 152 is folded around the first fold 161. The folded second edge 152 attaches to the textile sleeve 112 using a seam selected from the first plurality of seams 124.

The fourth edge 154 is folded around the second fold 162. The folded fourth edge 154 attaches to the textile sleeve 112 using a seam selected from the first plurality of seams 124. The third edge 153 is folded around the third fold 163. The folded third edge 153 attaches to the textile sleeve 112 using a seam selected from the first plurality of seams 124. The fifth edge 155 is folded around the fourth fold 164. The folded fifth edge 155 attaches to the textile sleeve 112 using a seam selected from the first plurality of seams 124.

The loop formed by the elastic webbing 131 of each individual strap 130 selected from the plurality of straps 103 is attached to the second surface 142 of the plate 111. The elastic seam 132 of each elastic webbing 131 is formed from a sewn seam that attaches the elastic webbing 131 to the textile sleeve 112.

In the second potential embodiment of the disclosure, the plate 111 is formed from plastic. The first sheeting 121 comprises a commercially available rectangular textile. The second sheeting 122 is a commercially available rectangular textile. The fastener 123 comprises a hook and loop fastener 125. Each of the first plurality of seams 124 is a sewn seam. The plate 111 is inserted into the textile sleeve 112.

In both the first potential embodiment and the second potential embodiment of the disclosure, the plurality of pockets 102 comprises a first pocket 171, a second pocket 172, a third pocket 173, and a fourth pocket 174. The plurality of straps 103 comprises a first strap 181, a second strap 182, and a third strap 183.

To use the invention 100, the sun visor 191 of the vehicle 192 is inserted through the loops formed by the plurality of straps 103. Domestic articles 193 are then inserted into the plurality of pockets 102.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Domestic Article: As used in this disclosure, a domestic article is an item or object: 1) that is commonly found within a household; or, 2) that is commonly carried by a person. Examples of domestic articles include, but are not limited to, keys and key fobs, personal data devices, glasses, remote controls, or personal storage items such as purses, briefcases, wallets, or cases.

Elastic: As used in this disclosure, an elastic is a material or object that deforms when a force is applied to it and that is able to return to its original shape after the force is removed. A material that exhibits these qualities is also referred to as an elastomeric material.

Elastic Webbing: As used in this disclosure, an elastic webbing is a webbing that contains elastic yarns as some of the yarns that make up the webbing. An elastic webbing is constructed such that the elastic webbing will stretch when a force is applied and will return to its original shape when after the force is removed.

Elastic Yarn: As used in this disclosure, an elastic yarn is a yarn formed from elastomeric materials.

Fastener: As used in this disclosure, a fastener is a device that is used to join or affix two objects. Fasteners generally comprise a first element, which is attached to the first object and a second element which is attached to the second object such that the first element and the second element join to affix the first object and the second object. Common fasteners include, but are not limited to, zippers, snaps, buttons, buckles, quick release buckles, or hook and loop fasteners.

Flap: As used in this disclosure, a flap is a piece of material that is hinged or otherwise attached to a surface using one side such that the piece of material hangs in such a way as to cover a hole in the surface.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook or loop surface" with the understanding that when the two objects are fastened together one of the two objects will have a hook surface and the remaining object will have the loop surface.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Pocket: As used in this disclosure, a pocket is a small pouch or storage space that is formed into an object. Pockets are often formed by joining a second textile or a second sheeting to a first textile or a first sheeting, respectively, by sewing or heat-sealing respectively.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, or an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheeting: As used in this disclosure, sheeting is a material, such as a textile, a plastic, or a metal foil, in the form of a thin flexible layer or layers.

Sleeve: As used in this disclosure, a sleeve is a covering within which an object may be contained.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Textile: As used in this disclosure, a textile is a material that is woven, knitted, braided or felted. Synonyms in common usage for this definition include fabric and cloth.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A storage apparatus comprising:
   a panel, a plurality of pockets, and a plurality of straps;
   wherein the plurality of pockets attach to the panel;
   wherein the plurality of straps attach to the panel;
   wherein each of the plurality of straps forms a loop that attaches the panel to a sun visor of a vehicle;
   wherein the storage apparatus is a structure that stores domestic articles;
   wherein the panel comprises a plate;
   wherein the plate is formed in the shape of a rectangular block;
   wherein the plate is further defined with a first surface and a second surface;
   wherein the plurality of pockets further comprises a collection of individual pockets;
   wherein each of the plurality of pockets is a securable pocket;
   wherein each individual pocket comprises a first sheeting, a second sheeting, a fastener, and a first plurality of seams;
   wherein the first sheeting a first rectangular sheeting that forms a containment chamber;
   wherein the first sheeting is further defined with a first edge, a second edge, a third edge, a fourth edge, a first fold, a second fold, and a third fold;
   wherein the second sheeting is a second rectangular sheeting that forms a flap;
   wherein the second sheeting is further defined with a fifth edge, a sixth edge, a seventh edge, an eighth edge, and a fourth fold;
   wherein the fastener secures the second sheeting to the first sheeting;
   wherein the first plurality of seams attach the first sheeting and the second sheeting to the panel;
   wherein the fastener is a hook and loop fastener;
   wherein the hook and loop fastener further comprises a first hook or loop surface, and a second hook or loop surface;
   wherein the first hook or loop surface of the hook and loop fastener attaches to the first sheeting of the individual pocket;
   wherein the second hook or loop surface of the hook and loop fastener attaches to the second sheeting of the individual pocket;

wherein the second hook or loop surface will lay on top of the first hook or loop surface when the second sheeting is folded on top of the first sheeting;
wherein the plurality of straps further comprises a collection of individual straps;
wherein each individual strap comprises an elastic webbing and an elastic seam;
wherein the elastic webbing is formed into a loop;
wherein the elastic webbing is attached to the second surface of the plate;
wherein the panel further comprises a textile sleeve;
wherein the textile sleeve is a sleeve formed from a textile material;
wherein the plate is formed from plastic;
wherein the first sheeting comprises a rectangular plastic sheeting;
wherein the second sheeting is a rectangular plastic sheeting;
wherein the plurality of pockets comprises a first pocket, a second pocket, a third pocket, and a fourth pocket;
wherein the plurality of straps comprises a first strap, a second strap, and a third strap;
wherein the first sheeting of the individual pocket attaches to the textile sleeve;
wherein the second edge is folded around the first fold;
wherein the folded second edge attaches to the textile sleeve using a seam selected from the first plurality of seams;
wherein the fourth edge is folded around the second fold;
wherein the folded fourth edge attaches to the textile sleeve using a seam selected from the first plurality of seams;
wherein the third edge is folded around the third fold;
wherein the folded third edge attaches to the textile sleeve using a seam selected from the first plurality of seams;
wherein the second sheeting of the individual pocket attaches to the textile sleeve;
wherein the fifth edge is folded around the fourth fold;
wherein the folded fifth edge attaches to the textile sleeve using a seam selected from the first plurality of seams;
wherein the plate is inserted into the textile sleeve;
wherein the loop formed by the elastic webbing of each individual strap selected from the plurality of straps is attached to the second surface of the plate;
wherein the elastic seam of each elastic webbing is formed from a sewn seam that attaches the elastic webbing to the textile sleeve;
wherein the plate is formed from plastic;
wherein the first sheeting comprises a rectangular textile;
wherein the second sheeting is a rectangular textile;
wherein each of the first plurality of seams is a sewn seam.

* * * * *